US011310432B2

(12) United States Patent
McCauley et al.

(10) Patent No.: US 11,310,432 B2
(45) Date of Patent: *Apr. 19, 2022

(54) USER INTERFACE FOR VISUALLY INDICATING BUFFERED AMOUNT OF VIDEO

(71) Applicant: GoPro, Inc., San Mateo, CA (US)

(72) Inventors: Grant Adam McCauley, San Mateo, CA (US); Michael Adkins Knott, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,587

(22) Filed: Apr. 24, 2021

(65) Prior Publication Data

US 2021/0337134 A1  Oct. 28, 2021

Related U.S. Application Data

(63) Continuation of application No. 16/855,264, filed on Apr. 22, 2020, now Pat. No. 10,999,516.

(51) Int. Cl.
*H04N 5/232* (2006.01)
*H04N 5/225* (2006.01)

(52) U.S. Cl.
CPC ..... *H04N 5/232941* (2018.08); *H04N 5/2252* (2013.01); *H04N 5/232933* (2018.08)

(58) Field of Classification Search
CPC ....... H04N 5/232941; H04N 5/232933; H04N 5/2252
See application file for complete search history.

(56) References Cited

U.S. PATENT DOCUMENTS

| | | | |
|---|---|---|---|
| 2006/0152599 A1* | 7/2006 | Yokonuma | H04N 1/00477 348/231.99 |
| 2010/0171861 A1* | 7/2010 | Ota | H04N 5/232939 348/333.02 |
| 2014/0085487 A1* | 3/2014 | Park | G06F 3/04883 348/207.1 |
| 2017/0280049 A1* | 9/2017 | Chen | H04N 5/232933 |
| 2019/0080066 A1* | 3/2019 | Van Os | G06F 3/0488 |
| 2020/0120264 A1* | 4/2020 | Miura | G09G 5/36 |

* cited by examiner

*Primary Examiner* — Amy R Hsu
(74) *Attorney, Agent, or Firm* — Esplin & Associates, PC

(57) ABSTRACT

An image capture device may buffer video footage in a memory buffer before a command to record video is received. The image capture device may present a progression of color along a path to reflect the amount of buffered video footage. When the command to record the video is received, the video may be generated to include both buffered video footage and the video footage captured after the command.

20 Claims, 6 Drawing Sheets

USER INTERFACE FOR VISUALLY INDICATING BUFFERED AMOUNT OF VIDEO

FIELD

This disclosure relates to visually indicating amount of video buffered for capture by an image capture device.

BACKGROUND

Image capture devices do not have intuitive interface that provides information on when or how much video has been stored in buffer for use in recording. Users may not know when or how much video is stored in buffer for encoding.

SUMMARY

This disclosure relates to image capture devices that visually indicates buffered amount of video. An image capture device may include a housing. The housing may carry one or more of an image sensor, an optical element, a buffer memory, a display, and/or other components. The optical element may guide light within a field of view to the image sensor. The image sensor may generate a visual output signal conveying visual information based on light that becomes incident thereon. The visual information may define visual content. The buffer memory may be configured to provide temporary information storage. The display may be configured to visually present information.

The visual information may be stored in the buffer memory. Amount of the visual information stored in the buffer memory may correspond to a buffered progress length.

A buffered-amount element may be presented on the display. The buffered-amount element may include a color progression along a path that reflects the buffered progress length. The buffered-amount element may visually indicate the amount of the visual information stored in the buffer memory. Activation of a trigger to capture the visual content may be detected. Responsive to the activation of the trigger, the visual content may be captured based on the visual information stored in the buffer memory and the visual information conveyed by the visual output signal, and the buffered-amount element may be changed to visually indicate the capture of the visual content.

An electronic storage may store visual information, information relating to visual content, information relating to buffer memory, information relating to amount of visual information stored in buffer memory, information relating to buffered progress length, information relating to buffered-amount element, information relating to trigger to capture visual content, information relating to capture of visual content, and/or other information.

The housing may carry one or more components of the image capture device. The housing may carry (be attached to, support, hold, and/or otherwise carry) one or more of an image sensor, an optical element, a buffer memory, a display, a processor, an electronic storage, and/or other components.

The image sensor may be configured to generate a visual output signal and/or other output signals. The visual output signal may be generated by the image sensor based on light that becomes incident thereon. The visual output signal may convey visual information and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The buffer memory may be configured to provide temporary information storage. The buffer memory may be used by the image capture device to temporarily store visual information and/or other information.

The display may be configured to visually present information. The display may be configured to present visual content, user interface, user interface elements, and/or other information.

The processor(s) may be configured by machine-readable instructions. Executing the machine-readable instructions may cause the processor(s) to facilitate visually indicating buffered amount of video. The machine-readable instructions may include one or more computer program components. The computer program components may include one or more of a buffer component, a buffered amount component, a trigger component, a capture component, and/or other computer program components.

The buffer component may be configured to store the visual information and/or other information in the buffer memory. Amount of the visual information stored in the buffer memory may correspond to a buffered progress length.

The buffered amount component may be configured to present a buffered-amount element and/or other user interface elements on the display. The buffered-amount element may include a color progression along a path. The color progression along the path may reflect the buffered progress length. The buffered-amount element may visually indicate the amount of the visual information stored in the buffer memory. In some implementations, an extent of the color progression along the path may indicate the amount of the visual information stored in the buffer memory.

In some implementations, the path may run along a border of the display. In some implementations, the path may form a bar or a circle.

In some implementations, a length of the path may reflect a maximum buffered progress length. In some implementations, the buffered-amount element may be presented on the display responsive to setting of the maximum buffered progress length.

The trigger component may be configured to detect activation of a trigger to capture the visual content. In some implementations, the trigger to capture the visual content may be activated based on user interaction with a physical button or a virtual button of the image capture device. In some implementations, the trigger to capture the visual content may be activated based on a voice command.

The capture component may be configured to, responsive to the activation of the trigger, (1) capture the visual content, and (2) change the buffered-amount element. The visual content may be captured based on the visual information stored in the buffer memory, the visual information conveyed by the visual output signal, and/or other information. The buffered-amount element may be changed to visually indicate the capture of the visual content.

In some implementations, a first color of the buffered-amount element may visually indicate storage of the visual information in the buffer memory, and a second color of the buffered-amount element may visually indicate the capture of the visual content. The second color may be different from the first color. The change of the buffered-amount element to visually indicate the capture of the visual content may include change of the buffered-amount element from including the first color to including the second color.

In some implementations, a highlight element may move along the path to indicate progression of the capture of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
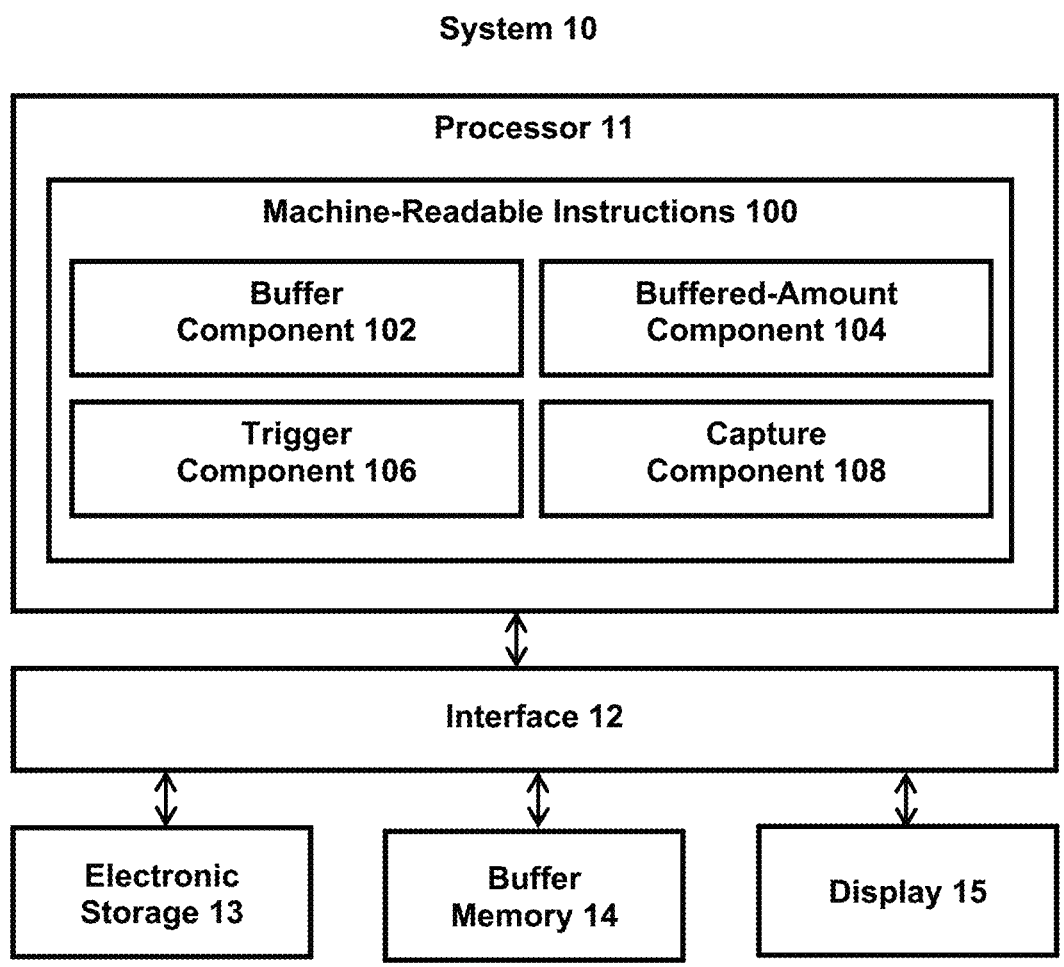
FIG. 1 illustrates an example system that visually indicates buffered amount of video.

FIG. 1 illustrates a system 10 for visually indicating buffered amount of video. The system 10 may include one or more of a processor 11, an interface 12 (e.g., bus, wireless interface), an electronic storage 13, a buffer memory 14, a display 15, and/or other components. The system 10 may include other components, such as one or more of an optical element and an image sensor. The system 10 may include and/or be part of an image capture device. The image capture device may include a housing, and one or more of the optical element, the image sensor, and/or other components of the system 10 (e.g., the processor 11, the electronic storage 13, the buffer memory 14, the display 15) may be carried by the housing the image capture device. The optical element may guide light within a field of view to the image sensor. The image sensor may generate a visual output signal conveying visual information based on light that becomes incident thereon. The visual information may define visual content. The buffer memory 14 may be configured to provide temporary information storage. The display 15 may be configured to visually present information.

The visual information may be stored by the processor 11 in the buffer memory 14. Amount of the visual information stored in the buffer memory 14 may correspond to a buffered progress length. A buffered-amount element may be presented on the display 15. The buffered-amount element may include a color progression along a path that reflects the buffered progress length. The buffered-amount element may visually indicate the amount of the visual information stored in the buffer memory 14. Activation of a trigger to capture the visual content may be detected. Responsive to the activation of the trigger, the visual content may be captured based on the visual information stored in the buffer memory 14 and the visual information conveyed by the visual output signal, and the buffered-amount element may be changed to visually indicate the capture of the visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to buffer memory, information relating to amount of visual information stored in buffer memory, information relating to buffered progress length, information relating to buffered-amount element, information relating to trigger to capture visual content, information relating to capture of visual content, and/or other information. While the electronic storage 13 and the buffer memory 14 are shown in FIG. 1 as separate components, this is merely as an example and is not meant to be limiting. In some implementations, the electronic storage 13 and the buffer memory 14 may be separate memory devices. In some implementations, the electronic storage 13 and the buffer memory 14 may be same memory device(s). For example, the buffer memory 14 may be a portion of the electronic storage 13.

Visual content and/or audio content may be captured by an image capture device. Visual content may refer to content of image(s), video frame(s), and/or video(s) that may be consumed visually. Audio content may refer to media content that may be consumed as one or more sounds. Audio content may include one or more sounds stored in one or more formats/containers, and/or other audio content. Audio content may include one or more sounds captured by one or more sound sensors (e.g., microphone).

For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view and/or audio content may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Content captured by an image capture device be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). For example, information defining visual content (visual information) may be stored within a single file or multiple files. Visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element, the image sensor, the buffer memory 14, the display 15, and/or other components of the system 10 may be carried by the housing of the image capture device.

Figure 3:
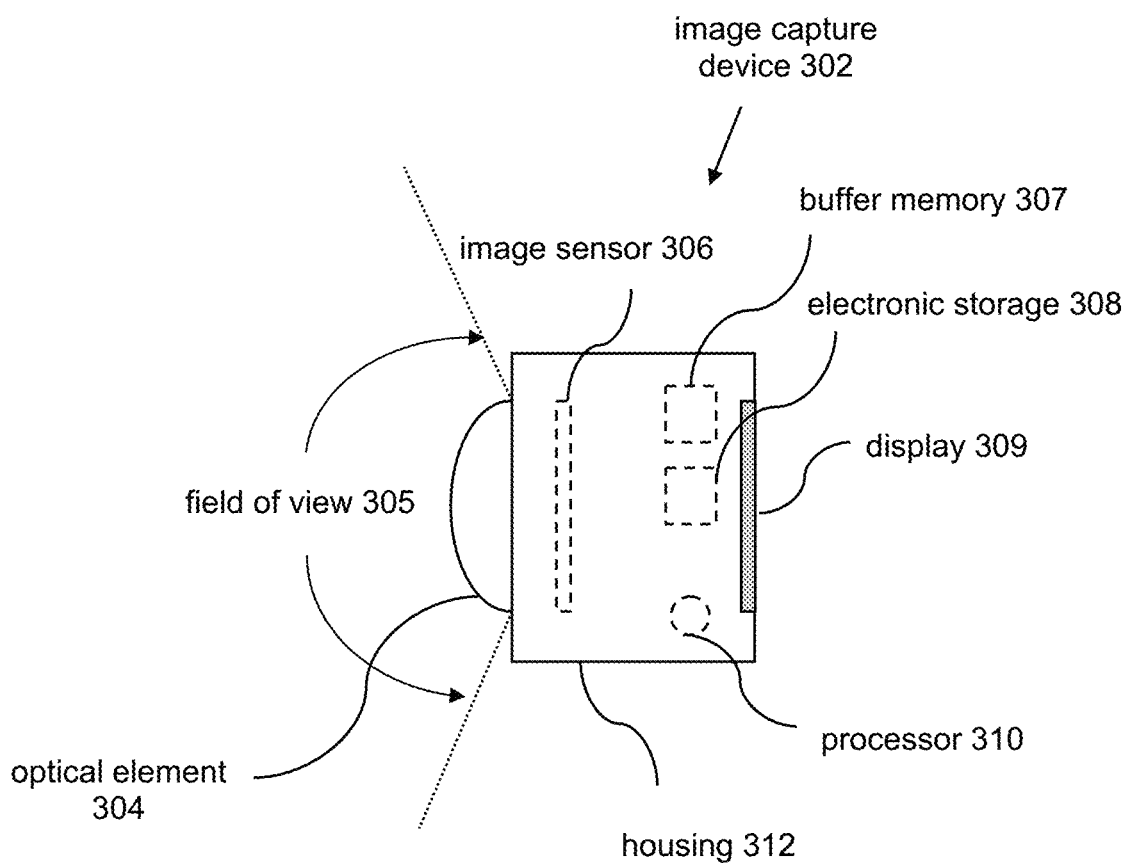
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a buffer memory 307, an electronic storage 308, a display 309, a processor 310, and/or other components. In some implementations, the buffer memory 307 may be part of the electronic storage 308.

One or more components of the image capture device 302 may be the same as, be similar to, and/or correspond to one or more components of the system 10. For example, the optical element 304 may be the same as, be similar to, and/or correspond to the optical element of the system 10. The image sensor 306 may be the same as, be similar to, and/or correspond to the image sensor of the system 10. The buffer memory 307 may be the same as, be similar to, and/or correspond to the buffer memory 14. The electronic storage 308 may be the same as, be similar to, and/or correspond to the electronic storage 13. The display 309 may be the same as, be similar to, and/or correspond to the display 15. The processor 310 may be the same as, be similar to, and/or correspond to the processor 11. The image capture device 302 may include other components not shown in FIG. 3, such as one or more sound sensors. The sound sensor(s) may be used by the image capture device 302 to capture audio content. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content. Video content may include other content captured by the image capture device 302, such as audio content captured by the image capture device.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The buffer memory 307 may be configured to provide temporary information storage. The buffer memory 307 may include one or more memory devices and/or one or more portions of memory device(s) that are set aside as a temporary holding place for data, such as the visual information conveyed by the visual output signal of the image sensor 306. The buffer memory 307 may be used by the image capture device 302 to temporarily store visual information and/or other information. In some implementations, the buffer memory 307 may be used by the image capture device 302 to temporarily store information (audio information) defining audio content captured by the image capture device 302. In some implementations, the buffer memory 307 may include one or more circular buffers.

For example, as the image sensor 306 converts received light into visual information defining visual content, the visual information may be temporarily stored in the buffer memory 307. The visual information stored in the buffer memory 307 may be used to capture visual content for use in generating a video. The visual information may be stored in the buffer memory 307 so that visual content captured for use in generating the video can include visual content observed by the image capture device 302 before the image capture device 302 is given command to capture the visual content. For example, the buffer memory 307 may be used to store 30 seconds of visual content. If a user interact with the image capture device 302 to prompt the image capture device to start recording at 1:00, then the visual information stored in the buffer memory 307 (defining visual content observed by the image capture device from 12:59:30 to 1:00) may be used to include 30 seconds of pre-user interaction footage in the video.

The display 309 may refer to an electronic device that provides visual presentation of information. The display 309 may include a color display and/or a non-color display. In some implementations, the display 309 may include one or more touchscreen displays. The display 309 may be configured to visually present information. The display 309 may be configured to present visual content, user interface, user interface elements, and/or other information. User interface (graphical user interface) may include a graphical form that enables a user to interact with the image capture device 302 and/or see information provided by the image capture device 302. User interface elements may refer to components of the user interface. User interface elements may refer to graphical elements of the user interface, such as windows, icons, buttons, graphics, and/or other visual indicators. User interface elements may visually provide information and/or enable a user to provide inputs to the image capture device 302 (by interacting with the user interface elements).

While the image capture device 302 is shown as having one display, this is merely as an example and is not meant to be limiting. In some implementations, the image capture device may include multiple displays. For example, the image capture device 302 may include a rear-facing display (e.g., the display 309) and a front-facing display. The front-facing display may enable a user to see visual content being captured by the image capture device 302, the user interface, the user interface elements, and/or other information while the image capture device is pointed towards the user. For example, one or more buffered-amount elements that visually indicates the amount of content (e.g., length of video, number of video frames) buffered in the buffer memory 307 may be presented on one or both of the front-facing display and the rear-facing display.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or other sensors (e.g., audio sensor). The processor 310 may facilitate transfer of information from the image sensor 306 and/or other sensors to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may temporarily store, in the buffer memory 307, the visual information conveyed by the visual output signals (as the visual output signals are generated, received, and/or detected). Amount of the visual information stored in the buffer memory 307 may correspond to a buffered progress length. The image capture device 302 may present a buffered-amount element on the display 309, with the buffered-amount element including a color progression along a path that reflects the buffered progress length. That is, the buffered-amount element presented on the display 309 may visually indicate the amount of the visual information stored in the buffer memory 307. The buffered-amount element may intuitively provide information on when and/or how much visual content and/or other content (e.g., audio content) has been stored in the buffer memory 307 for use in recording. The buffered-amount element may visually provide information to the user on when and/or how much visual content and/or other content are stored in the buffer memory 307 for encoding. The buffered-amount element may enable the user to capture (e.g., encode, record) video with better understanding of the buffered content.

The image capture device 302 may detect activation of a trigger to capture the visual content, such as user interaction with a record button. Responsive to the activation of the trigger, image capture device 302 may capture visual content for use in generating a video based on the visual information stored in the buffer memory and the visual information conveyed by the visual output signal. The image capture device 302 may generate the video by using the visual content temporarily stored in the buffer memory 307 and the visual content output by the image sensor 306. The image capture device 302 may change the buffered-amount element to visually indicate the capture of the visual content by the image capture device. The change in the buffered-amount element may show that the image capture device 302 has changed operation from buffering visual content in the buffer memory 307 to capturing visual content for use in generating the video (e.g., change from buffering mode to encoding mode).

Referring back to FIG. 1, the processor 11 (or one or more components of the processor 11) may be configured to obtain information to facilitate detecting hand obstructions. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate visually indicating buffered amount of video. The machine-readable instructions 100 may include one or more computer program components. The machine-readable instructions 100 may include one or more of a buffer component 102, a buffered amount component 104, a trigger component 106, a capture component 108, and/or other computer program components.

The buffer component 102 may be configured to store the visual information and/or other information in the buffer memory 14. The information (e.g., visual information, audio information) may be temporarily stored in the buffer memory 14 for potential use in generating a video. The buffer component 102 may store the visual information as they as conveyed by the visual output signal. The buffer component 102 may store latest visual information conveyed by the visual output signal in the buffer memory 14.

Amount of information (e.g., visual information, audio information) stored in the buffer memory 14 may correspond to a buffered progress length. The buffered progress length may refer to amount of content stored in the buffer memory 14. The buffered progress length may be measured in terms of time duration and/or frame numbers. For example, the amount of visual information stored in the buffer memory 14 may define visual content having a play duration of 30 seconds. As another example, the amount of visual information stored in the buffer memory 14 may define visual content of 900 images. If the images are captured at 30 images/second, then the play duration of the buffered images may be 30 seconds. Other buffered progress lengths are contemplated.

In some implementations, the buffer memory 14 may include insufficient free memory to operate as temporary storage of information. For example, the buffer memory 14 may be a part of the electronic storage 13 (e.g., SD card) that is used by the image capture device to store information (e.g., video file, audio file). Low free space on the electronic storage 13 may result in there not being sufficient memory space reserved for the buffer memory 14. In some implementations, one or more warnings may be presented on the display 15 that there is insufficient free memory to buffer visual content in the buffer memory. The user may be instructed to increase the amount of free space on the electronic storage 13 (e.g., SD card) to use the buffer feature of the image capture device.

The buffered amount component 104 may be configured to present a buffered-amount element and/or other user interface elements on the display 15. The buffered-amount element may refer to a user interface element that visually indicates the amount of information (e.g., visual information, audio information) stored in the buffer memory 14. The buffered-amount element may include one or more graphical elements, such as windows, icons, buttons, graphics, and/or other visual indicators, that visually provide information on how much information has been stored in the buffer memory 14. The buffered-amount element may visually provide information on the amount of information storage in the buffer memory 14 through movement of and/or change in visual effects.

For example, the buffered-amount element may include a color progression along one or more paths. A path may be defined in a single dimension, two-dimensions, and/or other dimensions. A path may include a straight path or a non-straight path (e.g., curved path, path with turns). A color progression along a path may refer to movement of one or more colors along the path. A color progression along a path may include movement of same color(s) and/or different colors along the path. In some implementations, a color progression along a path may simulate the path being filled with the color(s), or vice versa. For example, a path may form (run along) a shape (e.g., bar, circle, triangle), and a color progression along the path may simulate the shape being "filled" with the color, or the color being "emptied" from the shape.

The buffered-amount element may visually indicate the amount of the information (e.g., visual information, audio information) stored in the buffer memory 14 using the color progression along the path(s). The color progression along the path(s) may reflect the buffered progress length. The extent of the color progression along the path(s) may indicate the amount of the information stored in the buffer memory 14. That is, the length along which the color has progressed along the bar may indicate the buffered progress length. Longer length along the path may indicate/correspond to longer buffered progress length and shorter length along the path may indicate/correspond to shorter buffered progress length. Thus, the color progress along the path may be used to denote the amount of content (e.g., length of video, number of video frames) stored in the buffer memory 14.

The buffered-amount element may be presented as a single-piece element or as a multiple-pieces (multi-part) element. For example, the buffered-amount element may be presented as a single piece on the display 15, and the path may run along/within the single piece. As another example, the buffered-amount element may be presented as multiple pieces on the display 15, and the path may run across/within the multiple pieces.

Figure 4A:
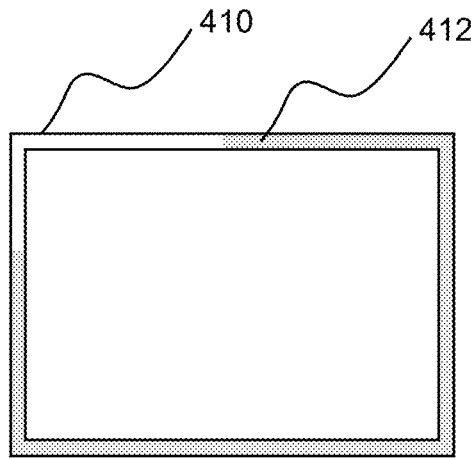
FIGS. 4A, 4B, 4C, 4D, and 4E illustrate example buffered-amount elements.

FIGS. 4A, 4B, 4C, 4D, and 4E illustrate example buffered-amount elements. In FIG. 4A, a buffered-amount element 412 may be presented on a display 410. The display 410 may be a display of an image capture device, such as a rear-facing display of the image capture device. The path of the buffered-amount element 412 may run along the border of the display 410. The buffered-amount element 412 may be positioned at the edges of the display 410. The length of the path (e.g., length of the buffered-amount element 412) may reflect a maximum buffered progress length. A maximum-buffered progress length may refer to the maximum amount of progress length of content that may be temporarily stored in the buffer memory 14 at the same time. The maximum-buffered progress length may be set based on user input, one or more defaults, and/or other information. For example, a user may interact with one or more user interfaces/user interface element to set the maximum-buffered progress length to a set duration (e.g., 30 seconds). As another example, buffering mode of the image capture device may have a default duration for the maximum-buffered progress length. As yet another example, the maximum-buffered progress length may be set based on the amount of free space available to be used for buffering (e.g., size of the buffer memory 14).

Color progression along the path of the buffered-amount element 412 may simulate the path being filled with one or more colors. The extent of the color progression along the path may indicate the amount of buffered content (e.g., buffered visual content, buffered audio content). The amount of time that the color progression takes to traverse the entire path may correspond to/equal to the maximum-buffered progress length. For example, based on the maximum-buffered progress length being 30 seconds, the color progression may take 30 seconds to run entirely along the buffered-amount element 412. That is, it may take 30 seconds for the buffered-amount element 412 to be filled. For example, in FIG. 4A, the color progression along the path (clockwise progression) may have proceeded along ¾ of the path, which may result in simulation of ¾ of the buffered-amount element 412 being filled with color(s). The ¾-fill of the buffered-amount element 412 may indicate that ¾ of the maximum-buffered progress length has been buffered in the buffer memory 14.

Such visual representation of the buffered-amount element 412 may enable the buffered progress length to be visually communicated to the user without taking up too much space on the display 410. Such visual representation of the buffered-amount element 412 may enable the buffered progress length to be visually communicated to the user without taking up space in the middle portion of the display 410, which may be used to provide information on the content being captured (e.g., preview of frames being captured) and/or other information. Using the boundary of the display 410 may allow the buffered progress length to be efficiently conveyed to the user without impacting the user's ability to receive other information through the display 410.

Figure 4B:
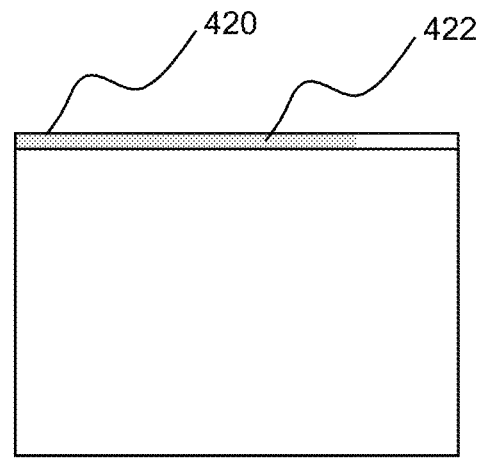

In FIG. 4B, a buffered-amount element 422 may be presented on a display 420. The display 420 may be a display of an image capture device, such as a rear-facing display of the image capture device. The path of the buffered-amount element 422 may form a bar along the top of the display 420. Other edge-positions of the buffered-amount element are contemplated. The length of the path (e.g., length of the buffered-amount element 422) may reflect a maximum buffered progress length. Color progression along the path of the buffered-amount element 422 may simulate the path being filled with one or more colors, with the extent of the color progression along the path indicating the amount of buffered content. For example, the color progression along the path (left-to-right progression) may have proceeded along ¾ of the path, which may result in simulation of ¾ of the buffered-amount element 422 being filled with color(s). The ¾-fill of the buffered-amount element 422 may indicate that ¾ of the maximum-buffered progress length has been buffered in the buffer memory 14.

Figure 4C:
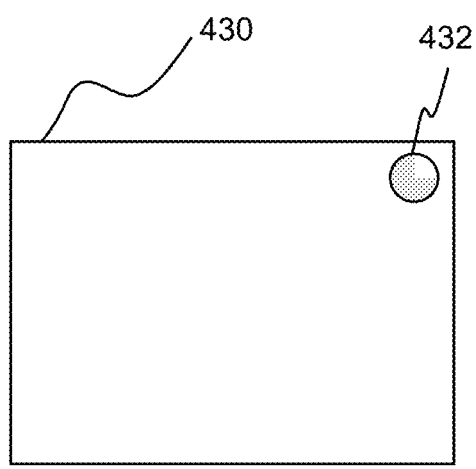

In FIG. 4C, a buffered-amount element 432 may be presented on a display 430. The display 430 may be a display of an image capture device, such as a rear-facing display of the image capture device. The path of the buffered-amount element 432 may form a circle at top-right corner of the display 430. Other positions of the buffered-amount element are contemplated. The length of the path (e.g., circumference of the buffered-amount element 432) may reflect a maximum buffered progress length. Color progression along the path of the buffered-amount element 432 may simulate the path being filled with one or more colors, with the extent of the color progression along the path indicating the amount of buffered content. For example, the color progression along the path (counter-clockwise progression) may have proceeded along ¾ of the path, which may result in simulation of ¾ of the buffered-amount element 432 being filled with color(s). The ¾-fill of the buffered-amount element 432 may indicate that ¾ of the maximum-buffered progress length has been buffered in the buffer memory 14.

Figure 4D:
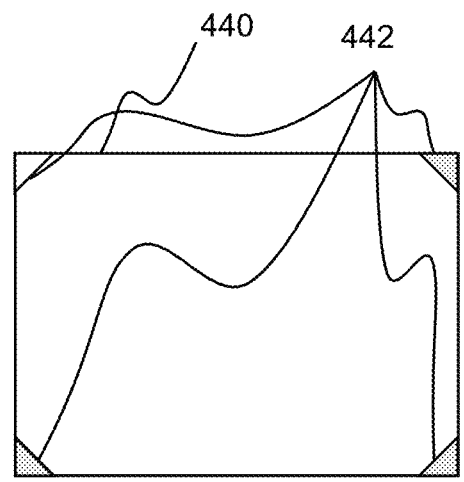

In FIG. 4D, a buffered-amount element 442 may be presented on a display 440. The display 440 may be a display of an image capture device, such as a rear-facing display of the image capture device. The buffered-amount element 442 may include four triangle pieces positioned at corners of the display 440. Other positions of the buffered-amount element are contemplated. The path of the buffered-amount element 432 may within the four triangles. The length of the path (e.g., lengths/height of the triangles) may reflect a maximum buffered progress length. Color progression along the path of the buffered-amount element 442 may simulate the path being filled with one or more colors, with the extent of the color progression along the path indicating the amount of buffered content. For example, the color progression along the path (clockwise progression) may have proceeded along ¾ of the path, which may result in simulation of 3 of 4 triangles of the buffered-amount element 442 being filled with color(s). The 3 of 4 triangle-fill of the buffered-amount element 442 may indicate that ¾ of the maximum-buffered progress length has been buffered in the buffer memory 14. Other shapes, sizes, and positions of buffered-amount element are contemplated.

Figure 4E:
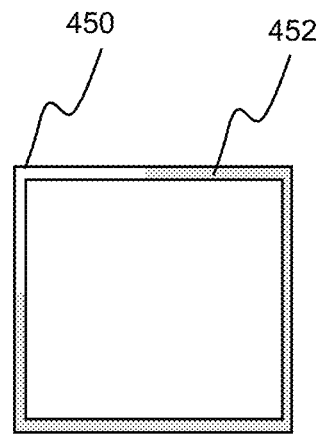

In FIG. 4E, a buffered-amount element 452 may be presented on a display 450. The display 450 may be a display of an image capture device, such as a front-facing display of the image capture device. The path of the buffered-amount element 452 may run along the border of the display 450. The buffered-amount element 452 may be positioned at the edges of the display 450. The length of the path (e.g., length of the buffered-amount element 452) may reflect a maximum buffered progress length. Color progression along the path of the buffered-amount element 452 may simulate the path being filled with one or more colors, with the extent of the color progression along the path indicating the amount of buffered content. For example, the color progression along the path (clockwise progression) may have proceeded along ¾ of the path, which may result in simulation of ¾ of the buffered-amount element 452 being filled with color(s). The ¾-fill of the buffered-amount element 452 may indicate that ¾ of the maximum-buffered progress length has been buffered in the buffer memory 14.

The length of the path (e.g., length of the buffered-amount element 412) may reflect a maximum buffered progress length. A maximum-buffered progress length may refer to the maximum amount of progress length of content that may be temporarily stored in the buffer memory 14 at the same time. The maximum-buffered progress length may be set based on user input, one or more defaults, and/or other information. For example, a user may interact with one or more user interfaces/user interface element to set the maximum-buffered progress length to a set duration (e.g., 30 seconds). As another example, buffering mode of the image capture device may have a default duration for the maximum-buffered progress length. As yet another example, the maximum-buffered progress length may be set based on the amount of free space available to be used for buffering (e.g., size of the buffer memory 14).

Color progression along the path of the buffered-amount element 412 may simulate the path being filled with one or more colors. The extent of the color progression along the path may indicate the amount of buffered content (e.g., buffered visual content, buffered audio content). The amount of time that the color progression takes to traverse the entire path may correspond to/equal to the maximum-buffered progress length. For example, based on the maximum-buffered progress length being 30 seconds, the color progression may take 30 seconds to run entirely along the buffered-amount element 412. That is, it may take 30 seconds for the buffered-amount element 412 to be filled. For example, in FIG. 4A, the color progression along the path (clockwise progression) may have proceeded along ¾ of the path, which may result in simulation of ¾ of the buffered-amount element 412 being filled with color(s). The ¾-fill of the buffered-amount element 412 may indicate that ¾ of the maximum-buffered progress length has been buffered in the buffer memory 14.

In some implementations, the buffered-amount element may be presented on the display 15 responsive to the buffer memory 14 being used to temporarily store information. For instance, the buffered-amount element may be presented on the display 15 responsive to the buffering mode of the image capture device being turned on. In some implementations, the buffered-amount element may be presented on the display 15 responsive to setting of the maximum buffered progress length. For instance, setting the maximum buffered progress length may turn on the buffering mode of the image capture device, and the buffered-amount element may be presented on the display 15 to show how much content has been buffered in the buffer memory 14.

The trigger component 106 may be configured to detect activation of one or more triggers to capture the visual content. A trigger to capture the visual content may include a thing, an event, a situation, and/or a condition that initiates the image capture device to convert, record, encode, and/or otherwise capture the visual content for inclusion in the video. A trigger may refer to one or more hardware components of the image capture device/device in communication with the image capture device, one or more software components of the image capture device/device in communication with the image capture device, one or more particular ways in which the image capture device/device in communication with the image capture device is being used, and/or other thing(s), event(s), situation(s), and/or condition(s). The trigger to capture the visual content may be received at the image capture device and/or other device(s) in communication with the image capture device (e.g., a smartphone/tablet controlling operation of the image capture device).

Activation of the trigger may indicate to the image capture device that the visual content is to be captured for use in generating video content. Activation of the trigger may indicate to the image capture device that the visual content observed by the image sensor is to be converted, recorded, encoded, and/or otherwise captured for inclusion in a video. Activation of the trigger may indicate to the image capture device that other content, such as audio content and/or metadata for the video, is to be captured.

Activation of a trigger may refer to action or process of making the trigger active or operative. Activation of a trigger may refer to occurrence and/or usage of the trigger. Activation of a trigger may refer to one or more of usage of a thing, occurrence of an event, occurrence of a situation, and/or occurrence of a condition. For example, activation of a trigger may include one or more of usage of hardware component(s) of the image capture device, usage of software component(s) of the image capture device, occurrence in which the image capture device is being used in particular way(s), and/or usage of other thing(s)/occurrence of other event(s)/situation(s)/condition(s). Activation of a trigger may provide one or more commands to the image capture device to change from buffering content to capturing content for use in generating a video. Activation of a trigger may provide one or more commands to the image capture device to change from buffering content to converting, recording, encoding, and/or otherwise capturing the content for inclusion in the video.

Activation of a trigger may be detected based on monitoring of the trigger. Activation of a trigger may be detected based on monitoring of the usage of the trigger and/or occurrence of the trigger. For example, activation of a trigger may be detected based on monitoring of one or more of usage of a thing, occurrence of an event, occurrence of a situation, and/or occurrence of a condition. Monitoring of a trigger may be performed based on observation and/or checking of information that characterizes usage and/or occurrence of the trigger. Activation of a trigger may be detected based on provision of one or more commands to the image capture device to capture content for use in generating a video. Other triggers, activations of triggers, and detection of activations of triggers are contemplated.

In some implementations, a trigger to capture the visual content may be activated based on user interaction with one or more buttons (e.g., a physical button, a virtual button) of the image capture device. User interaction with a button may include one or more of pressing the button, pulling the button, twisting the button, flipping the button, and/or other interaction with the button. A button may include a physical button, a virtual button, and/or other types of button. A physical button (hard button) may refer to a physical component of the image capture device that may be interacted upon by a user. A virtual button (soft button) may refer to a virtual component of the image capture device (e.g., presented on a touchscreen display) that may be interacted upon by a user. A virtual button may correspond to one or more user interface elements presented on the display 15 (e.g., record/shutter button icon).

A button may include a button with a function dedicated to capturing content (e.g., visual content, audio content), such as a record button and/or a shutter button. A button may include a multi-function button with one or more of its functions dedicated to capturing content. A button may include a variable function button with its operative function changing based on user selection, image capture mode operation, and/or other information. The operative function of the button may include prompting the image capture device to capture content.

In some implementations, a trigger to capture the visual content may be activated based on one or more voice commands, one or more motion of an image capture device, one or more analyses of content (e.g., visual content, audio content) captured by an image capture device, and/or other information. A voice command may refer to one or more words, phrases, sounds, and/or other audible commands that is associated with capturing content. A voice command may be recorded and/or detected by one or more sound sensors, such as a sound sensor of the image capture device. A voice command may cause change in operation of the image capture device from buffering content to capturing content for inclusion in a video.

Motion of an image capture device may refer to translational movement of the image capture device, rotational movement of the image capture device, direction of movement of the image capture device, speed of the image capture device, acceleration of the image capture device, and/or other movement of the image capture device. Particular motion of the image capture device may cause change in operation of the image capture device from buffering content to capturing content for inclusion in a video.

Analysis of content captured by an image capture device may include analysis of visual content, audio content, and/or other content captured by the image capture device. Analysis of visual content may include examination of one or more visual features/characteristics of the visual content. In some implementations, analysis of visual content may include detection of content within the visual content. Visual content detection may include identification of things within the visual content (e.g., face recognition, object recognition, scene recognition, emotion recognition), the quality and/or number of things within the visual content (e.g., number of faces, number of objects, level of emotion, amount of motion), and/or other features/characteristics relating to things depicted within the visual content. Analysis of audio content may include examination of one or more audio features/characteristics of the audio content. In some implementations, analysis of audio content may include detection of content within the audio content. Audio content detection may include identification of particular audio within the audio content (e.g., voice command, sound), the quality of audio within the visual content (e.g., energy, clarity), and/or other features/characteristics relating to audio captured within the audio content.

For example, the operation of the image capture device may change from buffering content to capturing content for inclusion in a video based on detection of particular objects (e.g., persons, faces), and/or detection of motion within the visual content. As another example, the operation of the image capture device may change from buffering content to capturing content for inclusion in a video based on the amount and/or type of motion detected within the visual content.

In some implementations, other information may be used to detect occurrences of events of interest. For example, location of the image capture device, motion of the image capture device, and/or other metadata/telemetry associated with the image capture device may be used to detect occurrences of events of interest. Detection of occurrences of events of interest may be used to change the operation of the image capture device from buffering content to capturing content for inclusion in a video.

The capture component 108 may be configured to, responsive to the activation of the trigger, (1) change the buffered-amount element, and (2) capture the visual content. The buffered-amount element may be changed to visually indicate the capture of the visual content. The change in the buffered-amount element may visually indicate that the image capture device has switched to buffering content to capturing (e.g., recording, encoding) content for use in generating a video. For example, the change in the buffered-amount element may visually indicate that the image capture device has switched from buffering mode to encoding mode. Change in the buffered-amount element may include change in one or more visual aspects of the buffered-amount element. Change in the buffered-amount element may include change in one or more of color, shape, size, position, and/or other visual aspects of the buffered-amount element.

Figure 5:
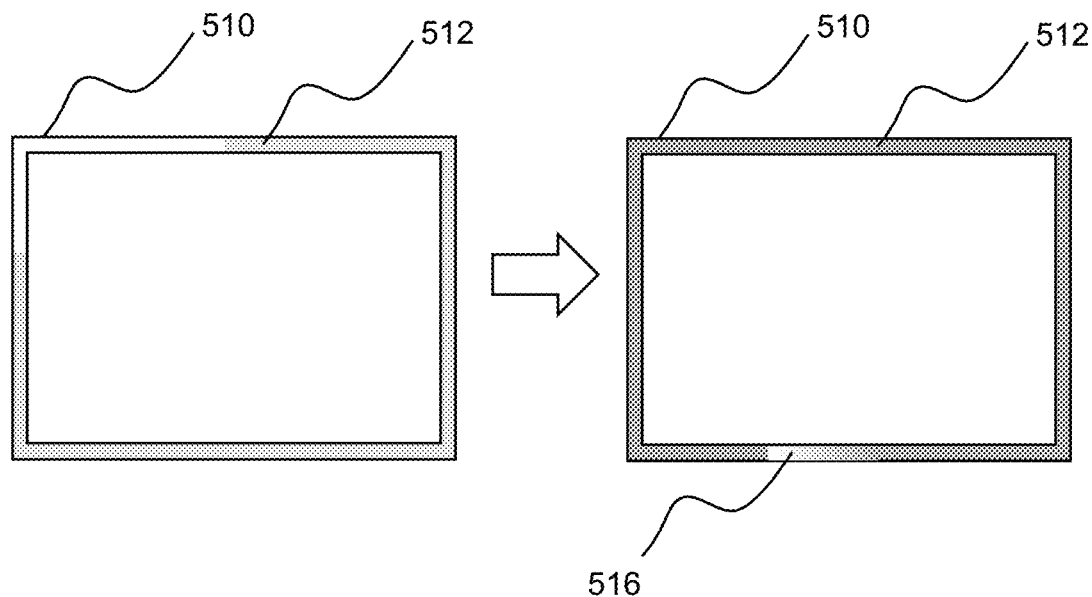
FIG. 5 illustrates an example change in a buffered-amount element.

FIG. 5 illustrates an example change in a buffered-amount element 512. The buffered-amount element 512 may be presented on a display 510. The path of the buffered-amount element 512 may run along the border of the display 510. The ¾-fill of the buffered-amount element 512 may indicate that ¾ of the maximum-buffered progress length has been buffered in the buffer memory 14. Responsive to the activation of the trigger to capture the visual content (e.g., user pressing record/shutter button on the image capture device), the color of the buffered-amount element 512 may changed to indicate the change from buffering content to recording/encoding content. That is, the color of the buffered-amount element 512 may change to indicate that the image capture device is recording the video. Change in color of the buffered-amount element 512 may include change in intensity of the color (e.g., bright to dark, dark to bright) and/or change from one color to another color. The buffered-amount element 512 may also change so that the entirety of the buffered-amount element 512 is filled with color.

For example, one color (e.g., blue) of the buffered-amount element 512 may visually indicate storage of the visual information in the buffer memory (e.g., buffering of content), and a different color (e.g., red) of the buffered-amount element 512 may visually indicate the capture of the visual content (e.g., recording of content). The change of the buffered-amount element 512 to visually indicate the capture of the visual content may include change of the buffered-amount element 512 from including the color corresponding to buffering (e.g., blue) to including the color corresponding to recording (e.g., red).

As another example, one or more additional visual elements may be presented to indicate that the image capture device is recording the video. For example, a red color may appear (e.g., as a red dot, as a red bar) near the buffered-amount element to indicate that the image capture device is in recording mode.

In some implementations, a highlight element may move along the path of the buffered-amount element to indicate progression of the capture of the visual content. A highlight element may refer to a visual element that is distinguishable from the buffered-amount element. A highlight element's movement along the path of the buffered-amount element may correspond to change in recorded progress length of the video. That is, while the progression of color along the path may be used to visually indicate how much content has been buffered in the buffer memory 14, the movement of the highlight element along the path may be used to visually indicate how much content has been recorded after initiation of the video recording. The speed of movement of the highlight element for content recording may be the same as the speed of color progression along the path for content buffering. The direction of movement of the highlight element for content recording may be in the same direction or in the opposite direction of the color progression along the path for content buffering.

For example, in FIG. 5, responsive to the activation of the trigger to capture the visual content (e.g., user pressing record/shutter button on the image capture device), a highlight element 516 may appear on the buffered-amount element 512 and move along the buffered-amount element 512 during the capture of the visual content. The movement of the highlight element 516 may visually indicate continued capture of the visual content. The speed with which the highlight element 516 moves along the buffered-amount element 512 may match the speed with which color progressed to fill the buffered-amount element 512. For example, based on the color-fill of the buffered-amount element 512 corresponding to buffering of 30 seconds of content, it may take recording for 30 seconds for the highlight element 516 to make one loop around the buffered-amount element 512. Other highlight elements are contemplated.

The visual content may be captured based on the visual information stored in the buffer memory 14, the visual information conveyed by the visual output signal, and/or other information. In some implementations, capturing the visual content based on the visual information stored in the buffer memory 14 and the visual information conveyed by the visual output signal may include selecting for inclusion in the video (1) the visual content stored in the buffer memory 14, and (2) the visual content being converted into visual information by the image sensor. That is, responsive to the activation of the trigger to capture the visual content, the capture component 108 may select both the visual information stored in the buffer memory 14 when the trigger is activated and the visual information generated by the image after the trigger is activated for use in generating the visual content for inclusion in the video. The selected visual information may be used to encode the visual content during and/or after capture. In some implementation, capturing the visual content based on the visual information stored in the buffer memory 14 and the visual information conveyed by the visual output signal may include encoding the corresponding visual content for inclusion in the video. That is, responsive to the activation of the trigger to capture the visual content, the capture component 108 may encode both the visual content stored in the buffer memory 14 when the trigger is activated and the visual content observed by the image after the trigger is activated for inclusion in the video.

The progress length of the video may include (1) a portion made up of visual content stored in the buffer memory 14 when the trigger is activated and (2) a portion made up of visual content observed by the image sensor after the trigger is activated. For example, the video may include both (1) images buffered in the buffer memory 14 when the record/shutter button is pressed by the user and images captured by the image sensor after the record/shutter button is pressed.

Figure 6:
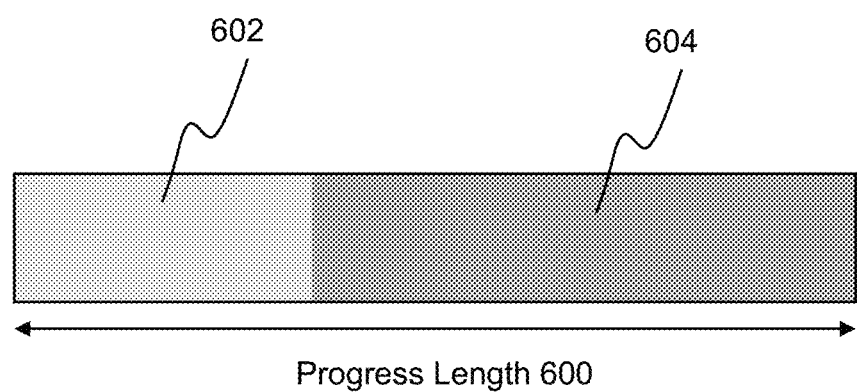
FIG. 6 illustrates an example progress length of captured visual content.

FIG. 6 illustrates an example progress length of captured visual content. The captured visual content may have a progress length 600. The progress length may include a portion 602 and a portion 602. The portion 602 may include the visual content that was temporarily stored in the buffer memory when the trigger to capture visual content was activated. The portion 602 may include the visual content that was captured by the image capture device after the trigger to capture visual content was activated. For example, the visual content captured for inclusion in a video includes both footage that was buffered before the record/shutter button was pressed and footage that was captured after the record/shutter button was pressed.

In some implementations, the buffering mode of the image capture device may be suspended and/or deactivated based on the trigger to capture the visual content not being activated. For example, when the buttering mode is started and the image capture device temporarily stores visual information in the buffer memory 14, the image capture device may operate in the buffering mode for a certain duration of time. If the duration of time passes with the trigger to capture the visual content being activated, the buffering mode of the image capture device may be suspended and/or deactivated. Such suspension/deactivation of the buffering mode may enable the image capture device to save battery life.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
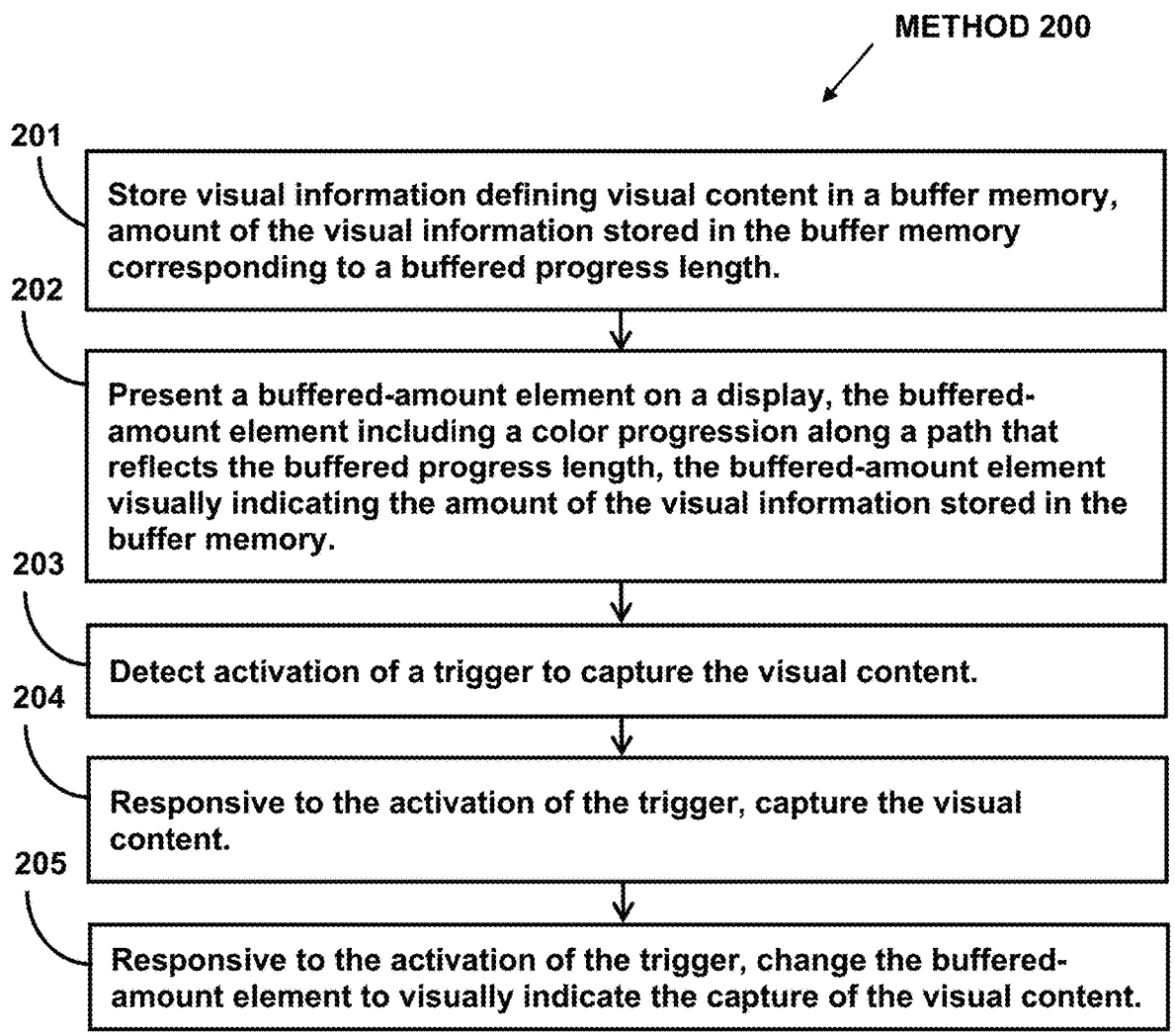
FIG. 2 illustrates an example method for visually indicating buffered amount of video.

FIG. 2 illustrates method 200 for visually indicates buffered amount of video. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a buffer memory, a display, and/or other components. The optical element may guide light within a field of view to the image sensor. The image sensor may generate a visual output signal conveying visual information based on light that becomes incident thereon. The visual information may define visual content. The buffer memory may be configured to provide temporary information storage. The display may be configured to visually present information.

At operation 201, the visual information may be stored in the buffer memory. Amount of the visual information stored in the buffer memory may correspond to a buffered progress length. In some implementation, operation 201 may be performed by a processor component the same as or similar to the buffer component 102 (Shown in FIG. 1 and described herein).

At operation 202, a buffered-amount element may be presented on the display. The buffered-amount element may include a color progression along a path that reflects the buffered progress length. The buffered-amount element may visually indicate the amount of the visual information stored in the buffer memory. In some implementations, operation 202 may be performed by a processor component the same as or similar to the buffered amount component 104 (Shown in FIG. 1 and described herein).

At operation 203, activation of a trigger to capture the visual content may be detected. In some implementations, operation 203 may be performed by a processor component the same as or similar to the trigger component 106 (Shown in FIG. 1 and described herein).

At operation 204, responsive to the activation of the trigger, the visual content may be captured based on the visual information stored in the buffer memory and the visual information conveyed by the visual output signal. In some implementations, operation 204 may be performed by a processor component the same as or similar to the capture component 108 (Shown in FIG. 1 and described herein).

At operation 205, responsive to the activation of the trigger, the buffered-amount element may be changed to visually indicate the capture of the visual content. In some implementations, operation 205 may be performed by a processor component the same as or similar to the capture component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for visually indicating buffered amount of video, the image capture device comprising:
    a housing;
    an image sensor carried by the housing and configured to generate a visual output signal conveying visual information based on light that becomes incident thereon, the visual information defining visual content;
    an optical element carried by the housing and configured to guide light within a field of view to the image sensor;
    a display configured to visually present information; and
    one or more physical processors carried by the housing, the one or more physical processors configured by machine-readable instructions to:
        buffer the visual content;
        present a buffered-amount element on the display, the buffered-amount element providing information on an amount of the buffered visual content;
        detect activation of a trigger to capture the visual content; and
        responsive to the activation of the trigger:
            capture the visual content using the buffered visual content; and
            change a color of the buffered-amount element to visually indicate change in operation of the image capture device from the buffering of the visual content to the capture of the visual content.

2. The image capture device of claim 1, wherein:
    a first color of the buffered-amount element visually indicates the buffering of the visual content;
    a second color of the buffered-amount element visually indicates the capture of the visual content, the second color different from the first color; and
the change of the color of the buffered-amount element to visually indicate the change in operation of the image capture device from the buffering of the visual content to the capture of the visual content includes change of the buffered-amount element from including the first color to including the second color.

3. The image capture device of claim 1, wherein the buffered-amount element includes a color progression along a path that reflects the amount of the buffered visual content.

4. The image capture device of claim 3, wherein an extent of the color progression along the path indicates the amount of the buffered visual content.

5. The image capture device of claim 3, wherein the path runs along a border of the display.

6. The image capture device of claim 3, wherein the path forms a bar or a circle.

7. The image capture device of claim 3, wherein a length of the path reflects a maximum amount of the buffered visual content.

8. The image capture device of claim 7, wherein the buffered-amount element is presented on the display responsive to setting of the maximum amount of the buffered visual content.

9. The image capture device of claim 1, wherein the trigger to capture the visual content is activated based on user interaction with a physical button or a virtual button of the image capture device.

10. The image capture device of claim 1, wherein the trigger to capture the visual content is activated based on a voice command.

11. A method for visually indicating buffered amount of video, the method performed by an image capture device, the image capture device including one or more processors, an image sensor, an optical element, and a display, the image sensor configured to generate a visual output signal conveying visual information based on light that becomes incident thereon, the visual information defining visual content, the optical element configured to guide light within a field of view to the image sensor, the display configured to visually present information, the method comprising:
    buffering the visual content;
    presenting a buffered-amount element on the display, the buffered-amount element providing information on an amount of the buffered visual content;
    detecting activation of a trigger to capture the visual content; and
    responsive to the activation of the trigger:
        capturing the visual content using the buffered visual content; and
        changing a color of the buffered-amount element to visually indicate change in operation of the image capture device from the buffering of the visual content to the capture of the visual content.

12. The method of claim 11, wherein:
    a first color of the buffered-amount element visually indicates the buffering of the visual content;
    a second color of the buffered-amount element visually indicates the capture of the visual content, the second color different from the first color; and
    the change of the color of the buffered-amount element to visually indicate the change in operation of the image capture device from the buffering of the visual content to the capture of the visual content includes change of the buffered-amount element from including the first color to including the second color.

13. The method of claim 11, wherein the buffered-amount element includes a color progression along a path that reflects the amount of the buffered visual content.

14. The method of claim 13, wherein an extent of the color progression along the path indicates the amount of the buffered visual content.

15. The method of claim 13, wherein the path runs along a border of the display.

16. The method of claim 13, wherein the path forms a bar or a circle.

17. The method of claim 13, wherein a length of the path reflects a maximum buffered progress length.

18. The method of claim 11, wherein the buffered-amount element is presented on the display responsive to setting of the maximum amount of the buffered visual content.

19. The method of claim 11, wherein the trigger to capture the visual content is activated based on user interaction with a physical button or a virtual button of the image capture device.

20. The method of claim 11, wherein the trigger to capture the visual content is activated based on a voice command.

\* \* \* \* \*